No. 882,202. PATENTED MAR. 17, 1908.
B. HUNT.
CONTINUOUS FILTER FOR CYANIDING AND THE LIKE.
APPLICATION FILED JAN. 17, 1907.
2 SHEETS—SHEET 1.
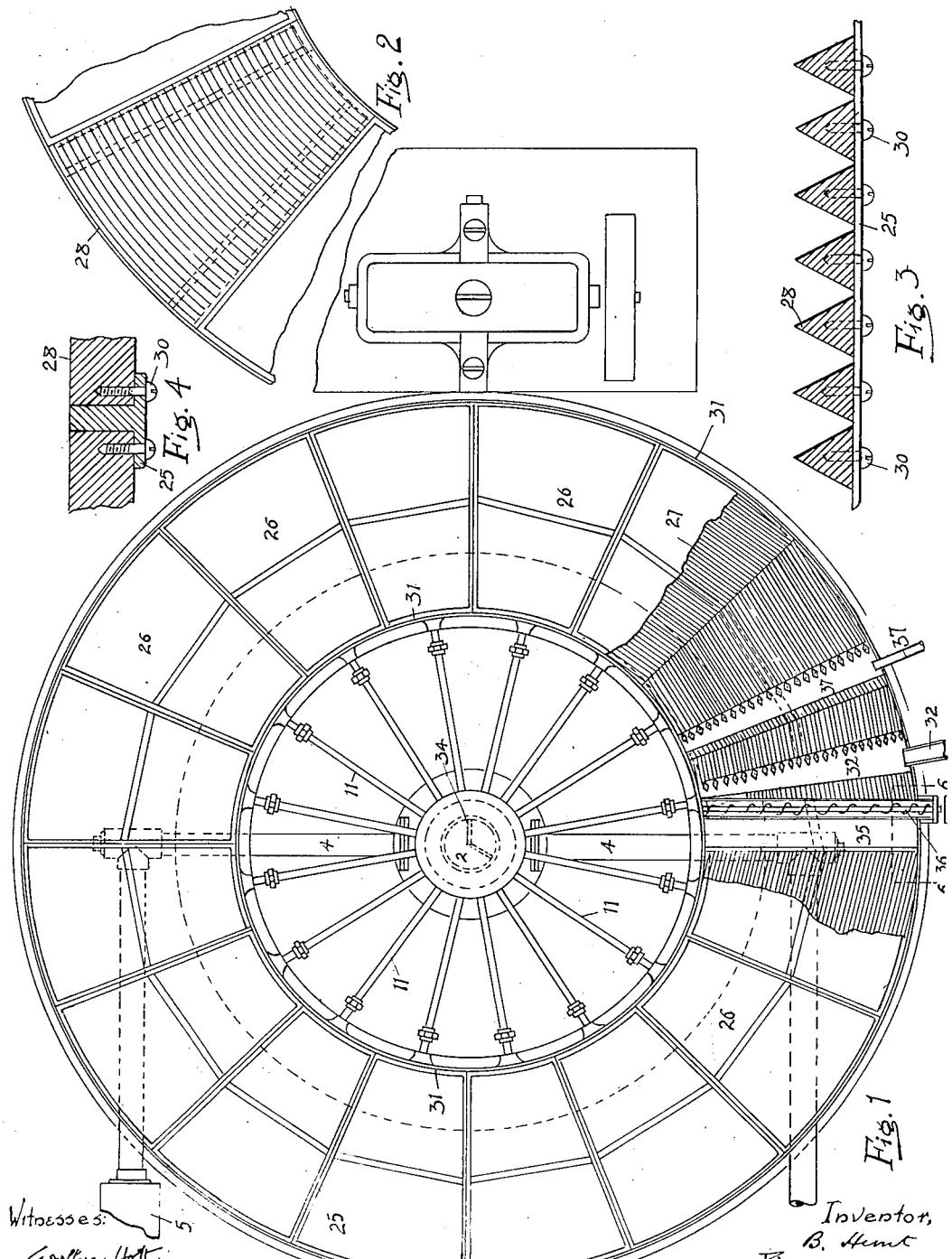

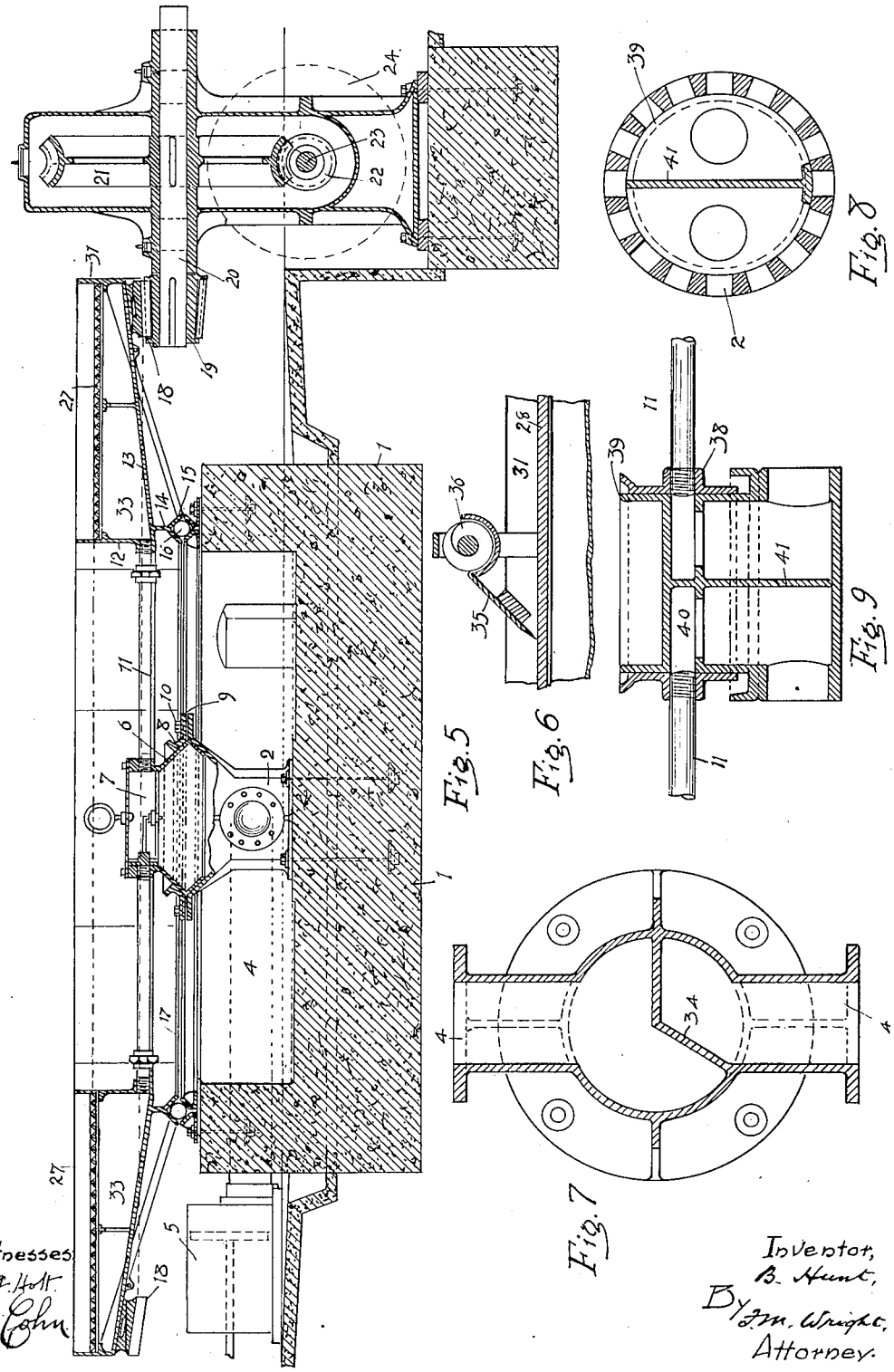

UNITED STATES PATENT OFFICE.

BERTRAM HUNT, OF SAN FRANCISCO, CALIFORNIA.

CONTINUOUS FILTER FOR CYANIDING AND THE LIKE.

No. 882,202.  Specification of Letters Patent.  Patented March 17, 1908.

Application filed January 17, 1907. Serial No. 352,796.

*To all whom it may concern:*

Be it known that I, BERTRAM HUNT, a subject of the King of Great Britain, residing at San Francisco, in the county of San Francisco and State of California, have invented new and useful Improvements in Continuous Filters for Cyaniding and the Like, of which the following is a specification.

This invention relates to improvements in continuous filters for cyaniding and other purposes, the objects of the invention being to provide a filter which will be rapid in its action, in which the filtering medium will always be maintained at its highest efficiency, which will be automatic in its working, thus requiring little attention, and will also require few repairs.

In the accompanying drawings Figure 1 is a broken plan view of my improved filter; Fig. 2 is a detail plan view of a modified form of filter support; Fig. 3 is an enlarged sectional view of the filter support; Fig. 4 is a detail sectional view of one of the partitions; Fig. 5 is a broken side view of the filter; Fig. 6 is a sectional view on a line 6—6 of Fig. 1; Fig. 7 is an enlarged horizontal section of a central hollow standard; Fig. 8 is a similar view of a modified form of standard; Fig. 9 is a vertical section of said modification.

Referring to the drawing, 1 indicates a suitable foundation, of concrete or the like, upon which is erected a central hollow standard 2, connected by conduits 4 with suction pumps 5. Said standard is formed with a flaring or conical top, adapted to receive the angular or conical wall 6 of a central rotating box or chamber 7, which is held down upon said standard by means of a conical collar 8, having a flange 9 secured to the flanged upper edge of the standard by means of bolts 10. Thus a substantially air-tight joint is made around said box 7. Said box is connected by tubes 11 with the inner wall 12 of a rotating filter casing, from the bottom 13 of which depends a circular rib 14, divided at the lower edge to form a seat 15, supported upon balls 16 which run in a circular runway 17 secured on the base or foundation. The bottom 13 of said casing slopes upwardly outwards and carries beneath its outer edge a level gear 18, which is engaged by a pinion 19 upon a horizontal shaft 20, which carries a worm wheel 21, operated by a worm 22 upon a shaft 23, driven by a pulley 24 from any suitable source of power. By this means this filter casing can be slowly rotated. Said filter is divided by radial partitions 25 into independent compartments 26, which are severally connected with the tubes 11. In each compartment is a filter section 27, which is formed of a series of bars 28, of triangular shape in cross section, arranged with their edge upwards and with their bases in close proximity to, but not touching, each other, being spaced apart at a suitable distance, say, one sixteenth of an inch. Said bars are secured at their ends by suitable means, as by screws 30, upon the partitions 25, which at the center are formed flush with tops of the bars. The bars may be either straight and arranged in a tangential direction as shown in Fig. 1, or they may be curved and concentric with each other as shown in Fig. 2. The angular spaces between said bars are filled with clean sand carefully screened, so as to consist of particles of approximately uniform size, and of such fineness that it cannot pass through the spaces at the bottom of the bars, and this sand constitutes the filtering medium. Walls 31 of a height commensurate with the amount of pulp to be fed to the filter, are provided at the inner and outer edges of the circular filter.

The pulp or other material to be filtered is fed uniformly over the circular filter by means of a distributer 32, and is then carried forward in the rotation of said filter, while it is being subjected to suction through the pipes 11 and the central chamber or box 7. The solids are thus left upon the top of the sand while the cyanid solution or other liquid to be filtered is drawn through the sand, and passes into the lower compartments 33 of the filter, thence by the pipes 11 to the central chamber 7, and thence by one of the pipes 4. If desired, wash water may be discharged upon the top of the filter at a subsequent point in its rotation, and this wash may be drawn off by one of the pipes 4 while the solution is drawn off by the other pipe. It is in that case necessary to divide the central chamber 7 into compartments communicating independently with the two pipes, this being effected by a partition 34 in the chamber, said compartments being arranged to correspond with the portions of the filter on to which the cyanid solution and the wash water are respectively discharged. In certain cases more than two compartments and independent pipes leading therefrom may be used. To remove the solids separated from the clear liquid by means of the sand, there is provided a scraper 35, which is arranged radially across the top of the filter surface, the lower edge of said scraper being just above the level of the upper edges of the triangular bars, so that as the filter advances said scraper removes from the upper portions thereof the tailings or other solids. These are forced onwards up the sloping surface of the scraper to its rear edge where they are discharged on to a suitable conveyer, a screw conveyer 36 being here shown. In some cases, if the slimes were to penetrate sufficiently deep into the sand to escape being removed by the scraper, the ultimate effect would be to clog up the filtering medium with the slimes and reduce its efficiency. I may therefore provide immediately in advance of the conveyer 36 a sand distributer 37, which continuously distributes upon the filter a sufficient amount of clean sand to form a layer thereof above the upper edges of the triangular bars and thereby arrest all the slimes before they reach the level of the upper edges of said bars, hence insuring that all of said slimes are removed by the scraper, and that the sand remains clean and effective for filtration. Said distributers 32, 37, each consist of a plate upon which the material to be distributed is discharged, and devices at the edge of the plate for forming distributing channels thereover. This, being the common form of distributers used for concentrators and other mining apparatus, need not be herein further specified.

In Figs. 8 and 9 is shown a modification of the union between the rotating filter casing and the stationary central standard. In this modification the tubes 11 are connected to a sleeve 38, which rotates around a cylinder 39, having an elongated aperture 40 on the level of the ends of the tubes. The compartments on the opposite side of the partition 41 are connected with the respective ports.

I claim:—

1. In a filter, the combination of an annular filter casing adapted to support a suitable layer of sand as a filtering medium, an annular layer of sand on said casing, means for continuously adding sand and for continuously feeding on to the successive points of the sand the material to be filtered, and means for continuously removing the residue and the impure sand from the successive points of the sand, substantially as described.

2. In a filter, the combination of a rotatable filter casing adapted to support a layer of sand, sand thereon, means for rotating said casing, means for feeding on to said sand the material to be filtered, means for feeding clean sand thereon, and means for removing the residue and impure sand, substantially as described.

In testimony whereof I have hereunto set my hand in the presence of two subscribing witnesses.

BERTRAM HUNT.

Witnesses:
FRANCIS M. WRIGHT,
D. B. RICHARDS.